United States Patent
Kim et al.

(10) Patent No.: US 12,165,342 B2
(45) Date of Patent: Dec. 10, 2024

(54) METHOD AND APPARATUS FOR GENERATING DEPTH IMAGE

(71) Applicant: SAMSUNG ELECTRONICS CO., LTD., Suwon-si (KR)

(72) Inventors: Jihye Kim, Anyang-si (KR); Seon Min Rhee, Seoul (KR); Heewon Kim, Seoul (KR); Seungju Han, Seoul (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 17/225,574

(22) Filed: Apr. 8, 2021

(65) Prior Publication Data

US 2021/0366139 A1 Nov. 25, 2021

Related U.S. Application Data

(60) Provisional application No. 63/028,066, filed on May 21, 2020.

(30) Foreign Application Priority Data

Jul. 28, 2020 (KR) .................. 10-2020-0094048

(51) Int. Cl.
*G06T 7/50* (2017.01)
*G06N 3/02* (2006.01)
*G06T 7/55* (2017.01)

(52) U.S. Cl.
CPC ...... *G06T 7/55* (2017.01); *G06T 2207/10024* (2013.01); *G06T 2207/10028* (2013.01);
(Continued)

(58) Field of Classification Search
None
See application file for complete search history.

(56) References Cited

U.S. PATENT DOCUMENTS

| | | | | |
|---|---|---|---|---|
| 6,058,397 A | * | 5/2000 | Barrus | ............... G06T 17/00 |
| | | | | 707/999.102 |
| 6,804,418 B1 | * | 10/2004 | Yu | .................. G06T 3/4023 |
| | | | | 382/172 |
| 2003/0194132 A1 | * | 10/2003 | Kiyuna | ............ G06T 7/143 |
| | | | | 382/128 |
| 2018/0231871 A1 | | 8/2018 | Wang et al. | |

(Continued)

FOREIGN PATENT DOCUMENTS

| CN | 109816710 A | 5/2019 |
|---|---|---|
| KR | 10-2015-0130185 A | 11/2015 |

(Continued)

OTHER PUBLICATIONS

Liu, Yang. "Multi-scale spatio-temporal feature extraction and depth estimation from sequences by ordinal classification." Sensors 20.7 (2020). (Year: 2020).*

(Continued)

*Primary Examiner* — Sean M Conner
(74) *Attorney, Agent, or Firm* — NSIP Law

(57) ABSTRACT

A method and apparatus for generating a depth image are provided. The apparatus receives an input image, extracts a feature corresponding to the input image, generates features for each depth resolution by decoding the feature using decoders corresponding to different depth resolutions, estimates probability distributions for each depth resolution by progressively refining the features for each depth resolution, and generates a target depth image corresponding to the input image based on a final estimated probability distribution from among the probability distributions for each depth resolution.

37 Claims, 10 Drawing Sheets

(52) U.S. Cl.
CPC ............... *G06T 2207/10048* (2013.01); *G06T 2207/20076* (2013.01)

(56) References Cited

U.S. PATENT DOCUMENTS

| | | | | |
|---|---|---|---|---|
| 2019/0197667 | A1* | 6/2019 | Paluri | G06V 10/774 |
| 2020/0104978 | A1* | 4/2020 | Kalchbrenner | G06T 3/4053 |
| 2020/0143552 | A1* | 5/2020 | Bao | G06T 5/50 |
| 2021/0144357 | A1 | 5/2021 | Kim et al. | |
| 2021/0350560 | A1* | 11/2021 | Laidlow | G06T 7/70 |

FOREIGN PATENT DOCUMENTS

| | | |
|---|---|---|
| KR | 10-1662972 B1 | 10/2016 |
| KR | 10-2017-0120688 A | 10/2017 |

OTHER PUBLICATIONS

Liao, Yiyi, et al. "Parse geometry from a line: Monocular depth estimation with partial laser observation." 2017 IEEE international conference on robotics and automation (ICRA). IEEE, 2017. (Year: 2017).*

Fuhrmann, Simon, and Michael Goesele. "Fusion of depth maps with multiple scales." ACM Transactions on Graphics (TOG) 30.6 (2011): 1-8. (Year: 2011).*

Johnston, Adrian, and Gustavo Carneiro. "Self-supervised Monocular Trained Depth Estimation using Self-attention and Discrete Disparity Volume." arXiv preprint arXiv:2003.13951 (2020). (Year: 2020).*

Bhat, Shariq Farooq, Ibraheem Alhashim, and Peter Wonka. "Localbins: Improving depth estimation by learning local distributions." European Conference on Computer Vision. Cham: Springer Nature Switzerland, 2022. (Year: 2022).*

Eigen, David et al., "Depth Map Prediction from a Single Image using a Multi-Scale Deep Network," *arXiv preprint arXiv*:1406.2283, Jun. 9, 2014 (pp. 1-9).

Fu, Huan, et al., "Deep Ordinal Regression Network for Monocular Depth Estimation," *Proceedings of the IEEE Conference on Computer Vision and Pattern Recognition*, 2018 (pp. 1-10).

Yao, Yao, et al., "MVSNet: Depth Inference for Unstructured Multi-view Stereo," *Proceedings of the European Conference on Computer Vision (ECCV)*, 2018 (pp. 1-18).

Liu, Chao, et al., "Neural RGB→D Sensing: Depth and Uncertainty from a Video Camera* Supplementary Document," *Proceedings of the IEEE/CVF Conference on Computer Vision and Pattern Recognition*, Jan. 9, 2019 (pp. 1-13).

Chen, Xiaotian, Xuejin Chen, and Zheng-Jun Zha. "Structure-Aware Residual Pyramid Network for Monocular Depth Estimation," *arXiv preprint arXiv*:1907.06023, Jul. 13, 2019 (pp. 1-7).

Hu, Junjie, et al. "Revisiting Single Image Depth Estimation: Toward Higher Resolution Maps with Accurate Object Boundaries," *2019 IEEE Winter Conference on Applications of Computer Vision (WACV)*. IEEE, 2019 (pp. 1-9).

Wei, Zizhuang, et al. "Semantic 3D Reconstruction with Learning MVS and 2D Segmentation of Aerial Images," *Applied Sciences*, 10, 4, 2020 (pp. 1-14).

Korean Office Action Issued on Jun. 3, 2024, in Counterpart Korean Patent Application No. 10-2020-0094048 (3 Pages in English, 6 Pages in Korean).

* cited by examiner

METHOD AND APPARATUS FOR GENERATING DEPTH IMAGE

This application claims the benefit under 35 U.S.C. § 119(e) of U.S. Provisional Application No. 63/028,066 filed on May 21, 2020, in the U.S. Patent and Trademark Office, and claims the benefit under 35 U.S.C. § 119(a) of Korean Patent Application No. 10-2020-0094048 filed on Jul. 28, 2020, in the Korean Intellectual Property Office, the entire disclosures of which are incorporated herein by reference for all purposes.

BACKGROUND

Field

The following description relates to a method and apparatus for generating a depth image.

Description of Related Art

Use of three-dimensional (3D) information is important for image recognition or scene understanding. Adding depth information to spatial information in two-dimensional (2D) makes it possible to effectively predict a spatial distribution of objects. Generally, depth information may be acquired from a depth image using a depth camera, and a quality of a depth image that may be acquired by the depth camera varies depending on a performance of the depth camera. For example, a resolution or a noise level of the acquired depth image may vary depending on the performance of the depth camera. Since an accuracy of depth information has a great influence on a quality of results based on the depth information, it is important to acquire a high-quality depth image.

The above disclosure is derived in a process of achieving the inventive concept, and is not necessarily publicly disclosed prior to the filing date of the present application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of generating a depth image, the method including receiving an input image, extracting a feature corresponding to the input image, generating features for each depth resolution by decoding the feature using decoders corresponding to different depth resolutions, estimating probability distributions for each depth resolution by progressively refining the features for each depth resolution, and generating a target depth image corresponding to the input image based on a final estimated probability distribution from among the probability distributions for each depth resolution.

The generating of the features for each depth resolution may include generating a feature of a first depth resolution from among the depth resolutions using a first decoder corresponding to the first depth resolution, and generating a residual feature of a second depth resolution from among the depth resolutions using a second decoder corresponding to the second depth resolution.

The generating of the features for each depth resolution may include generating a residual feature of a third depth resolution from among the depth resolutions using a third decoder corresponding to the third depth resolution.

The generating of the features for each depth resolution may include one of decoding the feature at uniformly set depth intervals, to generate the features for each depth resolution, or decoding the feature at differently set depth intervals, based on a spacing-increasing discretization (SID) scheme, to generate the features for each depth resolution.

The estimating of the probability distributions for each depth resolution may include estimating a first probability distribution corresponding to depth ranges of a first depth resolution from among the depth resolutions, based on a feature of the first depth resolution, and estimating a second probability distribution corresponding to depth ranges of a second depth resolution from among the depth resolutions, based on the first probability distribution and a residual feature of the second depth resolution.

The estimating of the second probability distribution may include refining the first probability distribution by the residual feature of the second depth resolution to estimate the second probability distribution corresponding to the depth ranges of the second depth resolution.

The estimating of the second probability distribution may include upscaling the first probability distribution, and estimating the second probability distribution by refining the upscaled first probability distribution by the residual feature of the second depth resolution.

The estimating of the probability distributions for each depth resolution may include estimating a third probability distribution corresponding to depth ranges of a third depth resolution from among the depth resolutions based on the second probability distribution and a residual feature of the third depth resolution.

The estimating of the third probability distribution may include refining the second probability distribution by the residual feature of the third depth resolution to estimate the third probability distribution corresponding to the depth ranges of the third depth resolution.

The estimating of the third probability distribution may include upscaling the second probability distribution, and estimating the third probability distribution by refining the upscaled second probability distribution by the residual feature of the third depth resolution.

The generating of the target depth image may include converting the final estimated probability distribution into the target depth image.

The generating of the target depth image may include calculating an expectation value of the final estimated probability distribution, estimating a refinement value of the expectation value based on the final estimated probability distribution, and generating the target depth image based on the expectation value and the refinement value.

The different depth resolutions may include at least two of a first depth resolution, a second depth resolution, and a third depth resolution, the first depth resolution may have a lower value than a value of the second depth resolution, the second depth resolution may have a higher value than a value of the first depth resolution, and the third depth resolution may have a higher value than a value of the second depth resolution.

The method may include discretizing a depth range of depth values of pixels included in the input image and dividing the depth range into a plurality of intervals.

The method may include outputting the target depth image.

The input image may include any one or any combination of a single color image, an infrared image, and a depth image.

In another general aspect, there is provided a method of generating a depth image, the method including receiving a depth image, receiving a color image, generating a probability distribution of a first depth resolution by discretizing the depth image, extracting a feature corresponding to the color image, generating features for each of at least one second depth resolution by decoding the feature using at least one decoder corresponding to the at least one second depth resolution, estimating probability distributions for each of the at least one second depth resolution by progressively refining the features for each of the at least one second depth resolution, and generating a target depth image corresponding to the color image based on a final estimated probability distribution from among the probability distributions for each of the at least one second depth resolution.

In another general aspect, there is provided an apparatus for generating a depth image, the apparatus including a communication interface configured to receive an input image, and a processor configured to extract a feature corresponding to the input image, to generate features for each depth resolution by decoding the feature using decoders corresponding to different depth resolutions, to estimate probability distributions for each depth resolution by progressively refining the features for each depth resolution, and to generate a target depth image corresponding to the input image based on a final estimated probability distribution from among the probability distributions for each depth resolution.

The processor may be configured to generate a feature of a first depth resolution from among the depth resolutions using a first decoder corresponding to the first depth resolution, and generate a residual feature of a second depth resolution from among the depth resolutions using a second decoder corresponding to the second depth resolution.

The processor may be configured to generate a residual feature of a third depth resolution from among the depth resolutions using a third decoder corresponding to the third depth resolution.

The processor may be configured to decode the feature at uniformly set depth intervals, to generate the features for each depth resolution, or decode the feature at differently set depth intervals, based on a spacing-increasing discretization (SID) scheme, to generate the features for each depth resolution.

The processor may be configured to estimate a first probability distribution corresponding to depth ranges of a first depth resolution from among the depth resolutions, based on a feature of the first depth resolution, and estimate a second probability distribution corresponding to depth ranges of a second depth resolution from among the depth resolutions, based on the first probability distribution and a residual feature of the second depth resolution.

The processor may be configured to estimate the second probability distribution corresponding to the depth ranges of the second depth resolution by refining the first probability distribution by the residual feature of the second depth resolution.

The processor may be configured to upscale the first probability distribution, and to estimate the second probability distribution by refining the upscaled first probability distribution by the residual feature of the second depth resolution.

The processor may be configured to estimate a third probability distribution corresponding to depth ranges of a third depth resolution from among the depth resolutions based on the second probability distribution and a residual feature of the third depth resolution.

The processor may be configured to estimate the third probability distribution corresponding to the depth ranges of the third depth resolution by refining the second probability distribution by the residual feature of the third depth resolution.

The processor may be configured to upscale the second probability distribution, and estimate the third probability distribution by refining the upscaled second probability distribution by the residual feature of the third depth resolution.

The processor may be configured to convert the finally estimated probability distribution into the target depth image.

The processor may be configured to calculate an expectation value of the final estimated probability distribution, estimate a refinement value of the expectation value based on the final estimated probability distribution, and generate the target depth image based on the expectation value and the refinement value.

The different depth resolutions may include at least two of a first depth resolution, a second depth resolution, and a third depth resolution, the first depth resolution may have a lower value than a value of the second depth resolution, the second depth resolution may have a higher value than a value of the first depth resolution, and the third depth resolution may have a higher value than a value of the second depth resolution.

The processor may be configured to discretize a depth range of depth values of pixels included in the input image and to divide the depth range into a plurality of intervals.

The communication interface may be configured to output the target depth image.

The input image may include any one or any combination of a single color image, an infrared image, and a depth image.

The apparatus may include any one or any combination of a smartphone, a smart television (TV), a tablet, a head-up display (HUD), a three-dimensional (3D) digital information display (DID), a 3D mobile device, an eye glass display (EGD), and a smart automobile.

In another general aspect, there is provided a method of generating a depth image, the method including receiving an input image, extracting a feature corresponding to the input image, generating a feature of a first depth resolution by decoding the feature using a first decoder corresponding to the first depth resolution, determining a first probability distribution corresponding to depth ranges of the first depth resolution, based on the feature of the first depth resolution, generating a residual feature of a second depth resolution using a second decoder corresponding to the second depth resolution, determining a second probability distribution corresponding to depth ranges of the second depth resolution, based on the first probability distribution and the residual feature of the second depth resolution, generating a target depth image corresponding to the input image based the second probability distributions, and outputting the target depth image A value of the first depth resolution may be lower than a value of the second depth resolution.

Other features and aspects will be apparent from the following detailed description, the drawings, and the claims.

Figure 1:
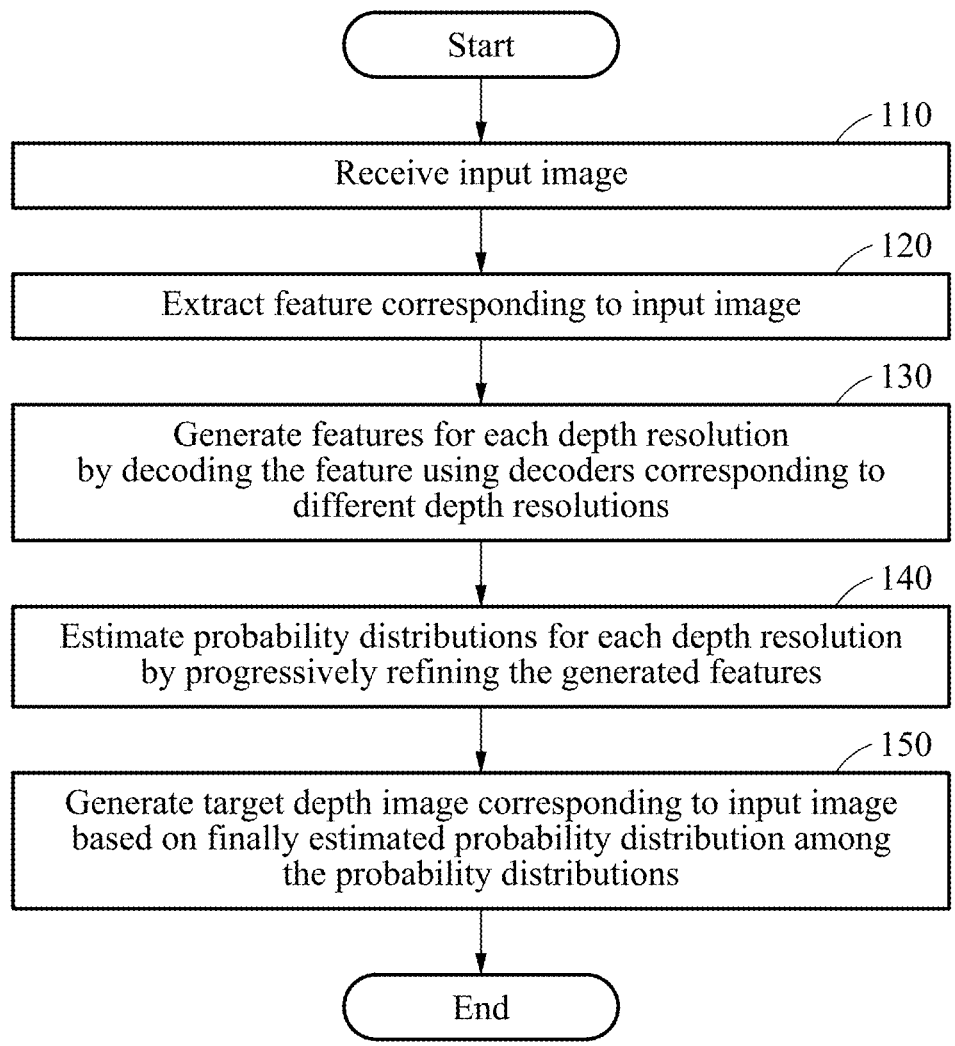
FIG. 1 is a diagram illustrating an example of a method of generating a depth image.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. Various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to examples. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example is described using a like name in another example. Unless otherwise described, description made in one example may be applicable to another example and detailed description within a duplicate range is omitted.

FIG. 1 is a diagram illustrating an example of a method of generating a depth image. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions, and FIG. 2 illustrates an example of a configuration and an operation of one such apparatus for generating a depth image.

Figure 2:
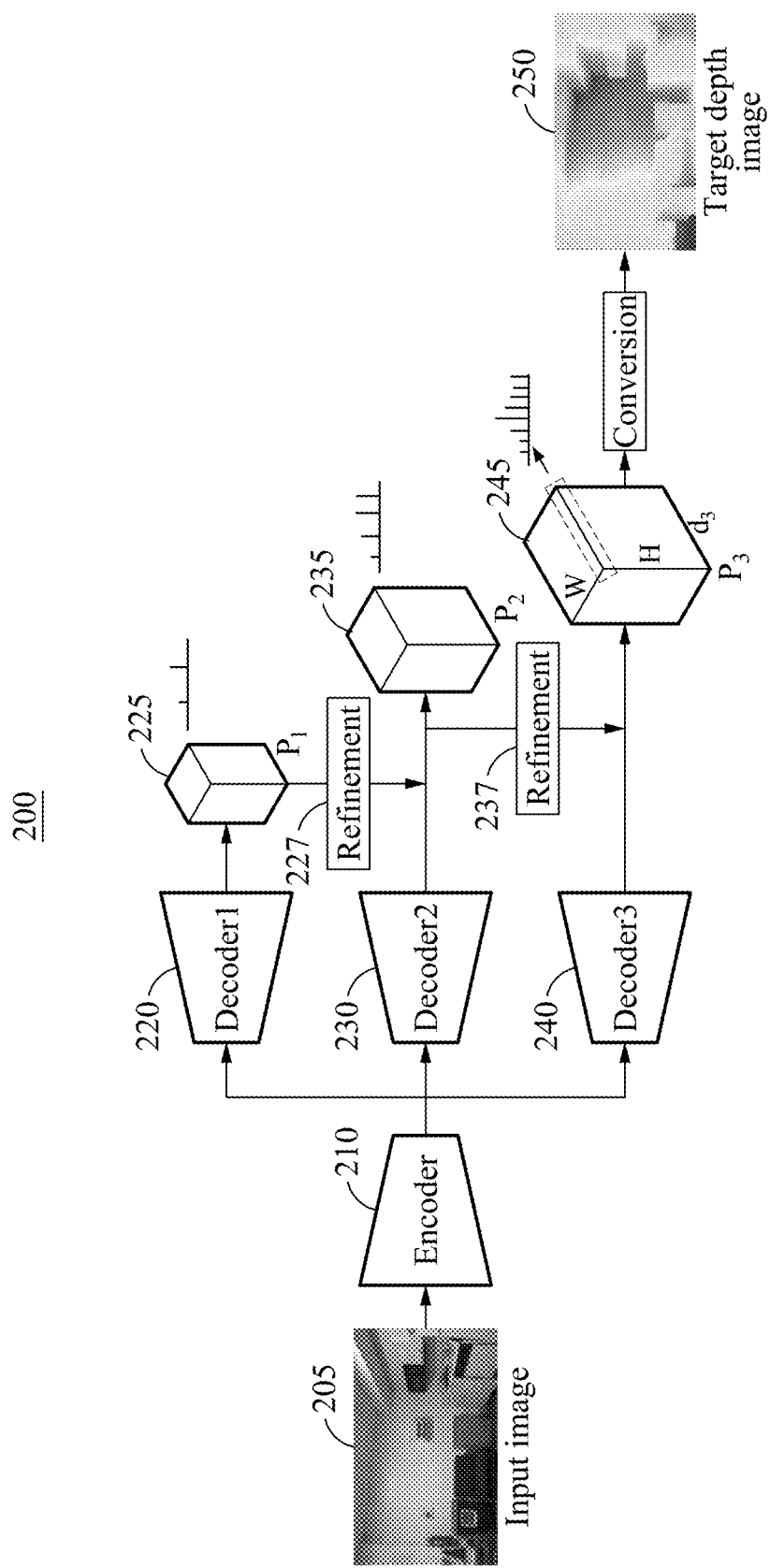
FIG. 2 illustrates an example of a configuration and an operation of an apparatus for generating a depth image.

Referring to FIGS. 1 and 2, an apparatus 200 (hereinafter, referred to as a "generation apparatus 200") for generating a depth image may generate a target depth image 250 corresponding to an input image 205 through operations 110 through 150 that will be described below. The generation apparatus 200 may be configured with an encoder-decoder neural network that includes one encoder and three decoders. An operation of the generation apparatus 200 with a deep neural network (DNN) including one encoder and three decoders will be described below, however, examples are not limited thereto. For example, the generation apparatus 200 may be configured with an encoder-decoder neural network that includes one encoder and two decoders.

In operation 110, the generation apparatus 200 receives the input image 205. The input image 205 may include, for example, any one or any combination of a single color image including RGB color information, an infrared image, and a depth image. The single color image may be called a "single RGB image". The single color image may be sensed by, for example, an image sensor such as a complementary metal-oxide-semiconductor (CMOS) image sensor, a charge-coupled-device (CCD) image sensor, or a stereo camera. The infrared image may be an image sensed by an infrared sensor. The single color image, the infrared image and/or the depth image sensed by respective sensors may be images obtained by sending the same scene, and may correspond to each other.

In operation 110, the generation apparatus 200 may discretize a depth range of depth values of pixels included in the input image 205 and may divide the depth range into a plurality of intervals. A process by which the generation apparatus 200 discretizes the depth range of the depth values and divides the depth range into the plurality of intervals will be further described below with reference to FIG. 3.

In operation 120, the generation apparatus 200 extracts a feature corresponding to the input image 205. For example, the generation apparatus 200 may extract features corresponding to the input image 205 through encoding by an encoder 210 such as a pre-trained SENet for image recognition task. The encoder 210 may extract four features with different spatial sizes that are ½, ⅙, ⅛ and ¼ times than a size of the input image 205. In an example, the extracted four features may be integrated using an up-projection processes.

In operation 130, the generation apparatus 200 generates features for each depth resolution by decoding the feature extracted in operation 120 using a first decoder 220, a second decoder 230 and a third decoder 240 corresponding to different depth resolutions. The different depth resolutions may include, but are not limited to, for example, at least two of a first depth resolution, a second depth resolution, and a third depth resolution. Depth resolutions may include a larger number of values of levels, for example, a fourth depth resolution, and a fifth depth resolution. In the present disclosure, the term "level" may be interchangeably used with a "resolution" or a "scale".

For example, the first depth resolution may have a lower value than that of the second depth resolution. Also, the second depth resolution may have a higher value than that of the first depth resolution. The third depth resolution may have a higher value than that of the second depth resolution. In other words, depth resolutions may change from low values to high values in an order of the first depth resolution, the second depth resolution, and the third depth resolution.

For example, the generation apparatus 200 may generate features for each depth resolution by decoding the feature extracted in operation 120 using pre-trained classifiers or the first decoder 220 through the third decoder 240. In this example, the feature extracted in operation 120 may equally be input to the first decoder 220 through the third decoder 240. For example, the first decoder 220 through the third decoder 240 may decode features step by step based on different depth resolutions through quantization of different levels.

For example, the generation apparatus 200 may generate a feature of the first depth resolution among the depth resolutions using the first decoder 220 corresponding to the first depth resolution. The generation apparatus 200 may generate a residual feature of the second depth resolution among the depth resolutions using the second decoder 230 corresponding to the second depth resolution. The generation apparatus 200 may generate a residual feature of the third depth resolution among the depth resolutions using the third decoder 240 corresponding to the third depth resolution.

In an example, the generation apparatus 200 may decode features at uniformly set depth intervals, to generate features for each depth resolution. In another example, the generation apparatus 200 may decode features at differently set depth intervals, to generate features for each depth resolution. In another example, the generation apparatus 200 may decode features at differently set depth intervals, based on a spacing-increasing discretization (SID) scheme using a partially convex function, or a logarithmic function, to generate features for each depth resolution.

A process by which the generation apparatus 200 generates features for each depth resolution will be further described below with reference to FIG. 5.

In operation 140, the generation apparatus 200 estimates probability distributions for each depth resolution by progressively refining the features for each depth resolution. An example of a concept of "progressively refining" features for each depth resolution by the generation apparatus 200 will be further described below with reference to FIG. 4.

For example, in operation 140, the generation apparatus 200 may estimate a first probability distribution $P_1$ 225 corresponding to depth ranges of the first depth resolution based on the feature of the first depth resolution generated using the first decoder 220. The generation apparatus 200 may estimate a second probability distribution $P_2$ 235 corresponding to depth ranges of the second depth resolution by refinement 227 of the first probability distribution $P_1$ 225 by the residual feature of the second depth resolution generated using the second decoder 230. For example, the second decoder 230 may be trained to output the residual feature of the second depth resolution based on the feature extracted in operation 120. The residual feature of the second depth resolution may include, for example, depth information of an intermediate resolution.

The generation apparatus 200 may estimate a third probability distribution $P_3$ 245 corresponding to depth ranges of the third depth resolution by refinement 237 of the second probability distribution $P_2$ 235 by the residual feature of the third depth resolution generated using the third decoder 240. For example, the third decoder 240 may be trained to output the residual feature of the third depth resolution based on the feature extracted in operation 120. The residual feature of the third depth resolution may include, for example, depth information of a high resolution, and may correspond to a feature that relatively accurately represents an edge component of an object. The generation apparatus 200 may guide a residual component of depth information that fails to be estimated at a relatively low depth resolution in a previous stage to be processed in a current stage, so that depth information corresponding to depth resolutions for each stage may be separated and independently estimated.

The refinements 227 and 237 may include both an upsampling operation and an integration operation with a probability distribution of a previous stage. A process by which the generation apparatus 200 estimates probability distributions for each depth resolution will be further described below with reference to FIG. 6.

In operation 150, the generation apparatus 200 generates the target depth image 250 corresponding to the input image 205, based on a finally estimated probability distribution, for example, the third probability distribution $P_3$ 245, among the probability distributions for each depth resolution. The generation apparatus 200 may convert the finally estimated probability distribution. For example, the generation apparatus 200 may convert the third probability distribution $P_3$ 245 that is a discrete probability distribution that is finally estimated, into a continuous value, to generate the target depth image 250.

In operation 150, the generation apparatus 200 may calculate an expectation value of the finally estimated probability distribution. In an example, an expectation value of a probability distribution may correspond to a weighted mean of the probability distribution.

The generation apparatus 200 may estimate a refinement value of the expectation value, based on the finally estimated probability distribution. For example, the generation apparatus 200 may estimate a refinement value of the expectation value by a convolutional neural network (CNN), however, examples are not limited thereto. The generation apparatus 200 may generate the target depth image 250 based on the expectation value and the refinement value.

The generation apparatus 200 may output the target depth image 250 generated in operation 150. For example, the generation apparatus 200 may implicitly output the target depth image 250 using an output device, for example, a display, or may explicitly output the target depth image 250 to the outside of the generation apparatus 200 via a communication interface.

The generation apparatus 200 may finally generate the target depth image 250 through a structure in which depth information is progressively refined through subdivision by depth resolutions. The generation apparatus 200 may constitute various depth resolutions or various scales of the input image 205, and may obtain different pieces of depth information for each depth resolution. The generation apparatus 200 may finally generate the target depth image 250 by combining the obtained depth information. Thus, the generation apparatus 200 may generate a high-quality depth image from a color image or an infrared image, instead of using a separate depth sensor or a separate depth image.

The generation apparatus 200 may generate a large number of depth images corresponding to a single RGB image or an infrared image by the above-described method, and may utilize the depth images in supervised learning. For example, the generation apparatus 200 may recognize a three-dimensional (3D) object or a 3D face included in the input image 205 based on the target depth image 250 generated corresponding to the input image 205, or may perform a function of out-of-focusing of a photograph, and/or a function of a digital ruler.

To increase utilization of a depth image, it is important to use a depth image with a relatively high resolution (or a relatively high quality). To obtain a desirable result using a depth image, it is important to obtain a depth image that well represents a depth feature (for example, a depth feature of an edge of an object). The generation apparatus 200 may generate a depth image with a high resolution and a high quality by more precisely and accurately estimating depth information using a method of generating a multi-scale-based depth image that will be described herein.

Depending on examples, the generation apparatus 200 may generate a depth image with a relatively high resolution (or a relatively high quality) from a depth image with a relatively low resolution (or a relatively low quality). An example of generating a depth image with a relatively high resolution from a depth image with a relatively low resolution by the generation apparatus 200 will be further described below with reference to FIGS. 9 and 10.

Figure 3:
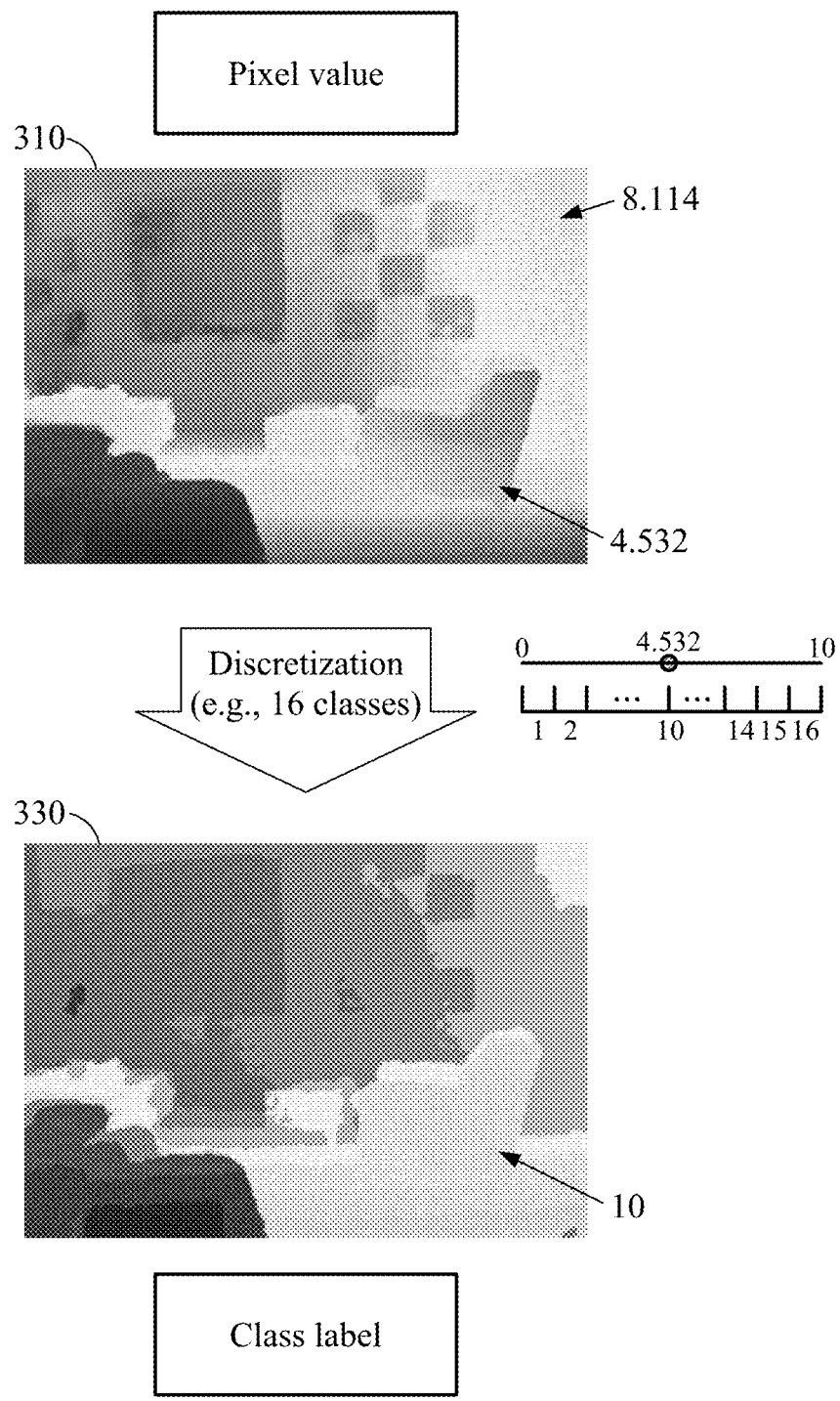
FIG. 3 illustrates an example of substituting pixel values with class labels of depth images for generating a depth image.

FIG. 3 illustrates an example of substituting pixel values with class labels of depth images for generation of a depth image. FIG. 3 illustrates a depth image 310 corresponding to an input image, and an image 330 having assigned class labels of depth ranges corresponding to the depth image 310.

For example, when a single RGB image is given, a generation apparatus may generate the depth image 310 based on a multi-scale classification.

The generation apparatus may substitute a task of discretizing the depth image 310 corresponding to the single RGB image and generating (or estimating) depth images with a task of estimating a class of each pixel included in the image 330.

For example, the generation apparatus may estimate depth values in units of pixels for the single RGB image and may generate the depth image 310. In this example, the generation apparatus may divide a range of the depth values into "N" countable intervals (for example, "16" intervals) through quantization of the depth values, and may switch a problem of generating a depth image to a problem of classifying ranges of depth values. Also, "intervals of ranges of depth values" may correspond to "classes", and the number "N" of intervals may be set to increase when a scale or a depth resolution increases. The higher a level or a depth resolution, the finer estimation may be possible. Thus, a target depth image with a relatively high value at a final level or a final depth resolution may be generated.

For example, a depth value of one pixel corresponding to a sofa in the depth image 310 may be assumed to be "4.532" and to correspond to a tenth interval among "16" intervals. The generation apparatus may assign a label, for example, "10", to a class of corresponding pixels corresponding to the sofa in the image 330 through discretization of the depth image 310. The generation apparatus may progressively refine probability distributions for each depth resolution by performing quantization for each depth resolution or for each of multiple levels.

Figure 4A:
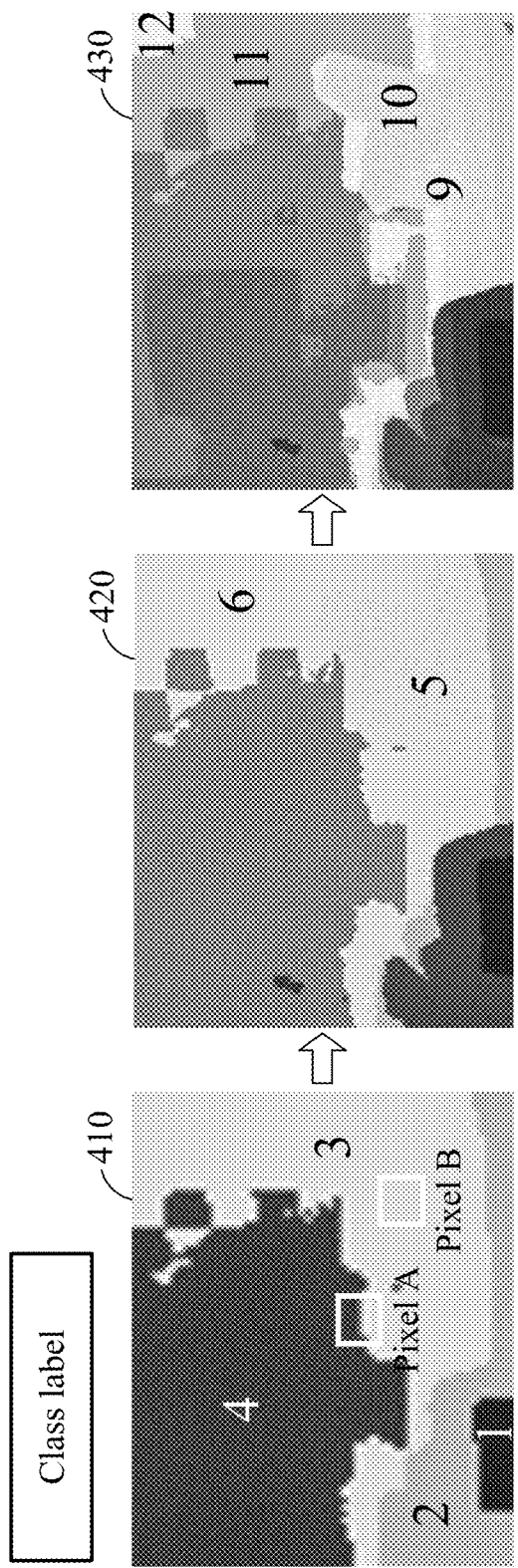
FIGS. 4A and 4B illustrate an example of progressively refining features for each depth resolution.
Figure 4B:
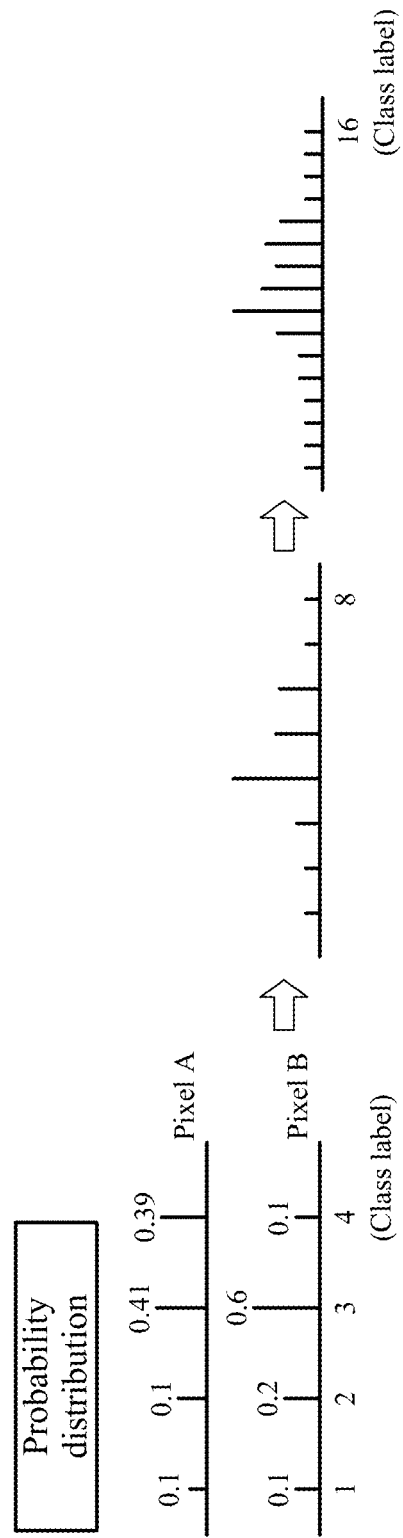

FIGS. 4A and 4B illustrate an example of progressively refining features for each depth resolution. FIG. 4A illustrates depth images 410, 420 and 430 in which a range of depth values, that is, a label of a class is gradually increased to 4, 8 and 16 through progressive refinement of depth values. FIG. 4B illustrates a result obtained by labeling classes for a probability distribution of pixels (for example, pixels A and B) included in the depth image 410 of FIG. 4A.

A generation apparatus may increase the number of depth ranges (that is, class labels of depth resolutions) to 4, 8 and 16 by finely refining probability distributions for each depth resolution step by step in a coarse-to-fine manner.

For example, the generation apparatus may upscale a first probability distribution corresponding to four class labels in the depth image 410, and may refine the first probability distribution to a second probability distribution corresponding to eight class labels as shown in a depth image 420. Also, the generation apparatus may upscale the second probability distribution corresponding to the eight class labels in the depth image 420, and may refine the second probability distribution to a third probability distribution corresponding to 16 class labels as shown in a depth image 430.

In this example, both the pixels A and B in the depth image 410 may belong to a class label 3, however, probabilities that each pixel belongs to the class label 3 may be different. For example, a probability that the pixel A belongs to the class label 3 may be "0.41", and a probability that the pixel B belongs to the class label 3 may be "0.6". The generation apparatus may fetch all information (for example, a probability distribution of each pixel) of a previous stage to a current stage, to reduce an error propagation from the previous stage to the current stage. The generation apparatus may predict a target depth image from a probability distribution corresponding to a final level (for example, "16" class labels).

Figure 5:
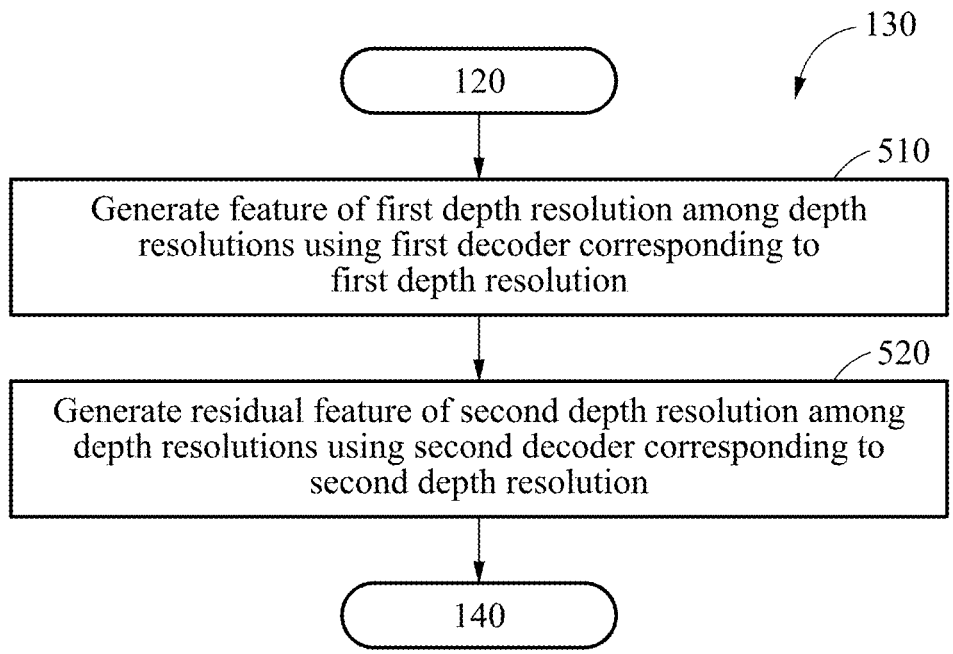
FIG. 5 illustrates an example of generating features for each depth resolution.

FIG. 5 illustrates an example of generating features for each depth resolution. Referring to FIG. 5. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. For example, a generation apparatus may generate features for each depth resolution by performing operations 510 and 520. In addition to the description of FIG. 5 below, the descriptions of FIGS. 1-4 are also applicable to FIG. 5, and are incorporated herein by reference. Thus, the above description may not be repeated here.

In operation 510, the generation apparatus generates a feature of a first depth resolution among depth resolutions using a first decoder corresponding to the first depth resolution.

In operation 520, the generation apparatus generates a residual feature of a second depth resolution among the depth resolutions using a second decoder corresponding to the second depth resolution. The residual feature may also be referred to as a "residual probability feature".

Depending on examples, the generation apparatus may also generate a residual feature of a third depth resolution among the depth resolutions using a third decoder corresponding to the third depth resolution.

Figure 6:
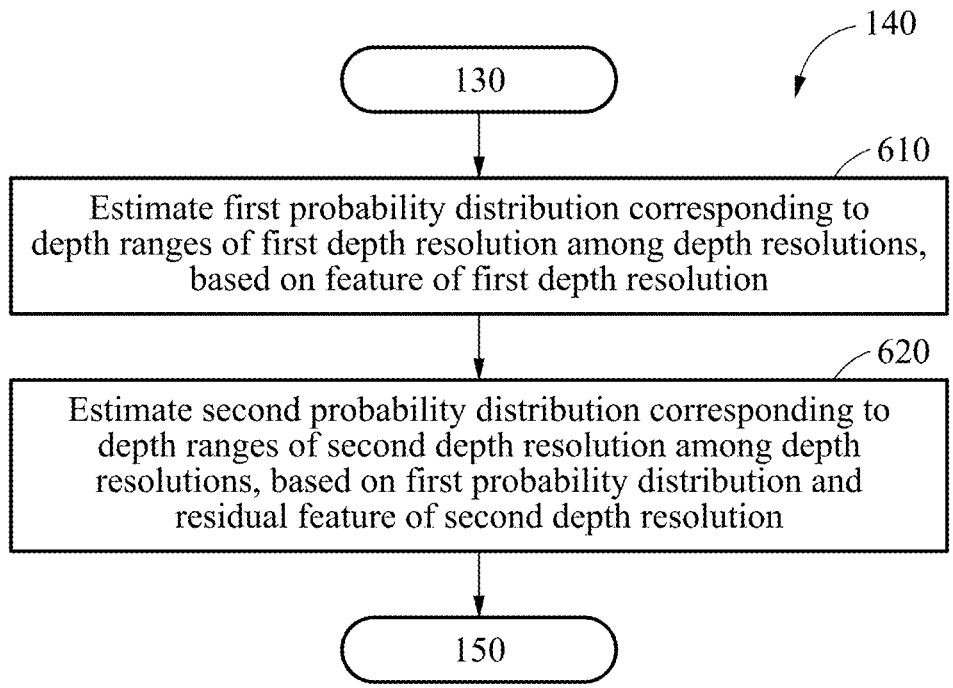
FIG. 6 illustrates an example of estimating probability distributions for each depth resolution.

FIG. 6 illustrates an example of estimating probability distributions for each depth resolution. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. For example, a generation apparatus may estimate probability distributions for each depth resolution by performing operations 610 and 620. In addition to the description of FIG. 5 below, the descriptions of FIGS. 1-4 are also applicable to FIG. 5, and are incorporated herein by reference. Thus, the above description may not be repeated here.

In operation 610, the generation apparatus estimates a first probability distribution corresponding to depth ranges of a first depth resolution among depth resolutions, based on a feature of the first depth resolution.

In operation 620, the generation apparatus estimates a second probability distribution corresponding to depth ranges of a second depth resolution among the depth resolutions, based on the first probability distribution and a residual feature of the second depth resolution.

For example, the generation apparatus may estimate the second probability distribution corresponding to the depth ranges of the second depth resolution by refining the first probability distribution by the residual feature of the second depth resolution.

The generation apparatus may upscale the first probability distribution through, for example, a bilinear interpolation, in operation 620, however, examples are not necessarily limited thereto. For example, the generation apparatus may refine the upscaled first probability distribution by the residual feature of the second depth resolution, to estimate the second probability distribution. In this example, the "refining" of the upscaled first probability distribution by the residual feature of the second depth resolution may be understood to include combining or summing the residual feature of the second depth resolution and the upscaled first probability distribution. In an example, the combining may correspond to a summation or a weighted sum of depth values in corresponding pixel positions.

Depending on examples, the generation apparatus may estimate a third probability distribution corresponding to depth ranges of a third depth resolution among the depth resolutions, based on the second probability distribution and a residual feature of the third depth resolution. The generation apparatus may refine the second probability distribution by the residual feature of the third depth resolution, to estimate the third probability distribution corresponding to the depth ranges of the third depth resolution. The generation apparatus may upscale the second probability distribution through, for example, a bilinear interpolation, however, examples are not necessarily limited thereto. The generation apparatus may refine the upscaled second probability distribution by the residual feature of the third depth resolution, to estimate the third probability distribution.

The generation apparatus may estimate depth values for each pixel based on a probability distribution, for example, an impulse function, and may transmit the probability distribution (for example, a residual feature) as a depth resolution of a next level. The generation apparatus may receive, as an input, a probability distribution of a previous level, and may correct and supplement the probability distribution by adding or subtracting the probability distribution to or from a depth resolution of a next level. In this example, a number of elements of the probability distribution may increase as stages progress.

Figure 7:
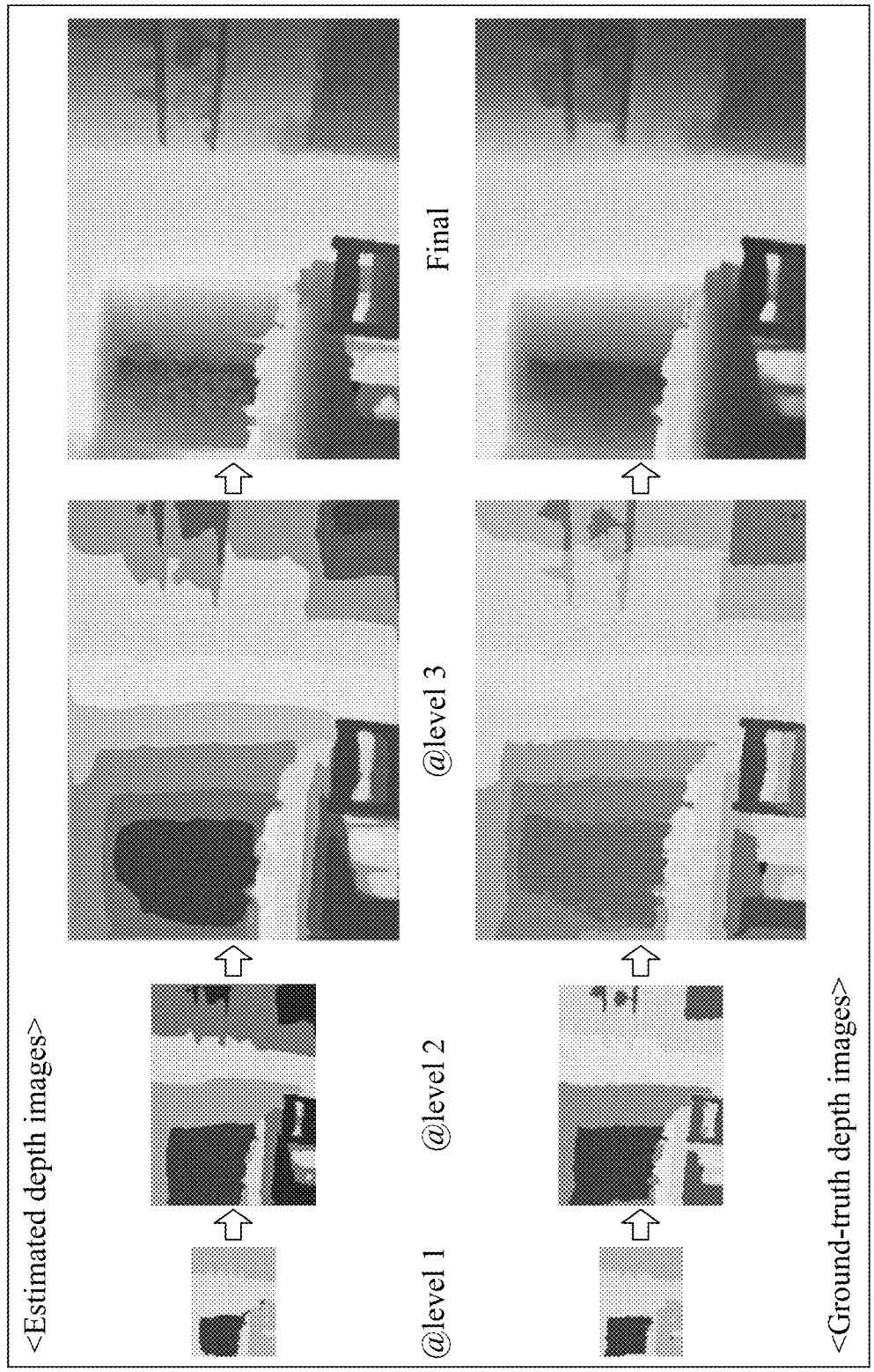
FIG. 7 illustrates an example of a training process of an apparatus for generating a depth image.

FIG. 7 illustrates an example of a training process of an apparatus for generating a depth image. A top portion of FIG. 7 illustrates depth images estimated by levels, and a bottom portion of FIG. 7 illustrates ground-truth depth images corresponding to the estimated depth images.

A generation apparatus may estimate a depth value corresponding to each level and a probability distribution of depth values through refinement in a probability distribution domain for each level or for each depth resolution, using a DNN including an encoder and decoders. The generation apparatus may train classifiers or decoders by levels to minimize a difference between depth values of pixels estimated at each level and depth values of the same pixels in a ground-truth depth image as the pixels at the same level.

For example, the generation apparatus may compare an estimated depth image to a ground-truth depth image corresponding to a ground truth of depth information, and may calculate a difference between the estimated depth image and the ground-truth depth image. The generation apparatus may adjust values of parameters constituting a neural network to reduce the difference between the estimated depth image and the ground-truth depth image. For example, the generation apparatus may find an optimal parameter value to minimize a value of a loss function that defines the difference between the estimated depth image and the ground-truth depth image. In this example, the loss function may be defined in various forms, by a classification scheme, or a regression scheme. Depending on how the loss function is defined, a scheme of adjusting parameter values, or a calibration process of depth information for generation of the estimated depth image may vary.

For example, a loss function L may be defined by a sum of a classification loss function $L_{cla}$ and a data loss function $L_{dep}$, as shown in Equation 1 below.

$$L = \sum_{k=1}^{3} L_{cla}(P_k, T_k) + \alpha L_{dep}(\hat{g}_k, h_k) \quad \text{[Equation 1]}$$

In Equation 1, $T_k$ denotes a one-hot vector having "1" on a position of a correct class and having "0" at a k-th depth resolution, $g_k$ and denotes aground-truth depth image at the k-th depth resolution.

The generation apparatus may find an optimal parameter value for each of classifiers or decoders included in a neural network by repeatedly performing the above process with respect to a large number of training images.

Through the above-described training process, a second decoder may be trained to output a residual feature of a second depth resolution based on a feature extracted by the encoder, and a third decoder may be trained to output a residual feature of a third depth resolution based on the feature extracted by the encoder.

Figure 8:
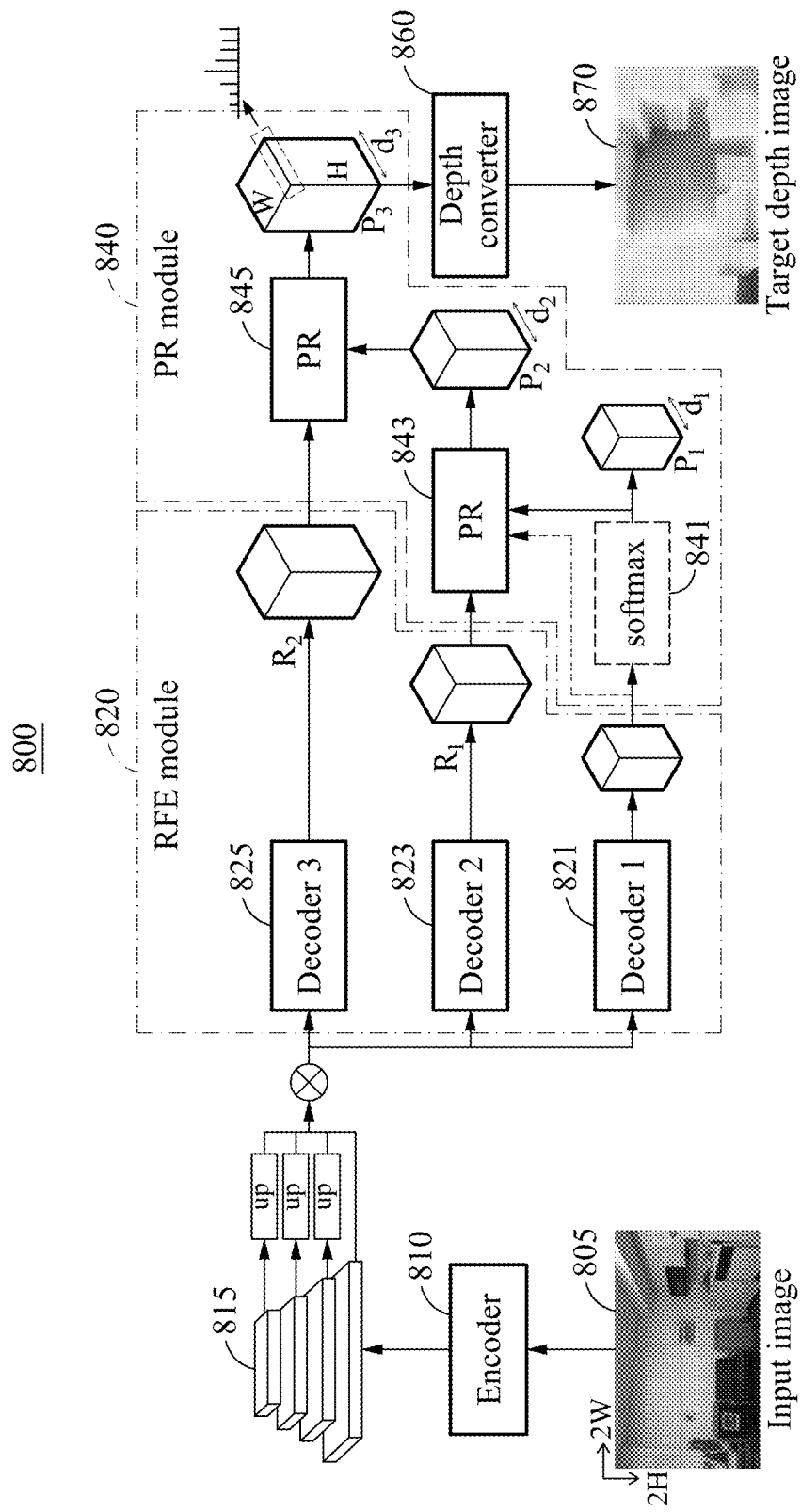
FIG. 8 illustrates another example of a configuration and an operation of an apparatus for generating a depth image.

FIG. 8 illustrates an example of a configuration and an operation of an apparatus 800 for generating a depth image (hereinafter, referred to as a "generation apparatus 800"). Referring to FIG. 8, the generation apparatus 800 may include an encoder 810, a residual feature extraction module 820 (hereinafter, referred to as an "RFE module 820"), a probability distribution refinement module 840 (hereinafter, referred to as a "PR module 840"), and a depth converter 860. The RFE module 820 may include a first decoder 821, a second decoder 823, and a third decoder 825.

The RFE module 820 may include three decoders, for example, the first decoder 821, the second decoder 823, and the third decoder 825, configured to perform decoding based on three depth resolutions. Also, the PR module 840 may include a softmax performing unit 841, and probability distribution refiners 843 and 845 (hereinafter, referred to as "PRs 843 and 845").

In FIG. 8, $R_1$, and $R_2$ may represent residual features corresponding to a second depth resolution and a third depth resolution, respectively. $P_1$, $P_2$, and $P_3$ may represent probability distributions corresponding to depth ranges of a first depth resolution, a second depth resolution, and a third depth resolution, respectively. Also, $d_1$, $d_2$, and $d_3$ may represent a number of intervals (or classes) of depth ranges of the first depth resolution, the second depth resolution, and the third depth resolution, respectively.

For example, the generation apparatus 800 may perform a multi-scale depth classification from a single image by a DNN. The DNN may perform coarse-to-fine estimation of per-pixel depth values. To this end, a continuous depth interval may be quantized into multiple sets of discrete labels with different granularities. Also, a probability distribution corresponding to depth ranges of predicted depth resolutions provided by a series of classifiers may be refined, and a depth value of each pixel may be computed by a weighted sum of the refined probability distribution. Through the above multi-scale classification, quantization artifacts may be effectively reduced through progressive prediction and progressive depth refinement while simplifying a task.

The generation apparatus 800 may predict depth values of all pixels by changing a monocular depth estimation for a single RGB image to a multi-scale classification task. The generation apparatus 800 may predict a probability distribution for discretized depth values, and may predict a target depth image at a final level based on the probability distribution, to generate a smooth depth map without discretization artifacts. To achieve a higher accuracy, the generation apparatus 800 may adjust a final probability distribution by incorporating a refinement module for post-processing, to maximize an accuracy.

For example, when an input image 805 (for example, a single RGB image) is received, the generation apparatus 800 may encode the input image 805 using the encoder 810. The encoder 810 may extract four features 815 having different spatial sizes that are ⅟32, ⅟16, ⅛ and ¼ times a size of the input image 805. The four features 815 may be integrated through up-projection processes. The generation apparatus 800 may perform decoding on the features integrated through the up-projection processes for each of three different depth resolutions.

The RFE module 820 may be operated by a few combinations of dilated convolution filters with various dilation rates r∈ {3, 6, 12, 18} to capture multiple levels of receptive fields. The residual features $R_1$ and $R_2$ extracted from the RFE module 820 may be supplied to the PR module 840.

The PR module 840 may estimate probability distributions for each depth resolution by aggregating features of previous levels. A finest probability distribution estimated by the PR module 840 may be supplied to the depth converter 860, to finally generate a target depth image 870 or a final depth map.

For example, the generation apparatus 800 may estimate a probability distribution $\{P_k\}_{k=1}^{3}$ corresponding to three different depth resolutions using the first decoder 821 through the third decoder 825. A probability distribution may be hierarchically estimated through refinement processes on multiple stages. To predict a depth resolution-based classification in a decoding stage, a SID using a logarithmic function may be employed. The generation apparatus 800 may use different levels of quantization in each stage of decoding.

For example, the whole depth interval [α, β] may be divided into three different numbers $d_1$, $d_2$ and $d_3$ for depth ranges, and an initial probability feature may be predicted through a neural network. The generation apparatus 800 may refine or correct values constituting a probability distribution in response to a depth resolution gradually increasing.

The probability distributions $P_1$, $P_2$, and $P_3$ for each depth resolution estimated by the generation apparatus 800 may have different spatial and channel resolutions. For example, when H and W denote a height and a width of a depth image at a finest depth resolution, $P_k$ may have a dimension of $H_k \times W_k \times d_k$. In this example, $$H_k = \frac{H}{2^{3-k}} \text{ and } W_k = \frac{W}{2^{3-k}}$$

may be satisfied. Also, H and W may denote a height and a width of a depth image at the finest depth resolution or at a finest level. Also, $P_{k,p}$ may represent a possibility that a depth value of a p-th pixel exists in a predetermined interval at a k-th depth resolution or a k-th level.

For example, the generation apparatus 800 may predict a first probability distribution $P_1$ from a feature of the first depth resolution that is a coarsest depth resolution generated by the first decoder 821 corresponding to the first depth resolution. Depending on examples, the generation apparatus 800 may predict the first probability distribution $P_1$ from the feature of the first depth resolution by the softmax performing unit 841, or may directly predict the first probability distribution $P_1$ from the feature of the first depth resolution instead of using the softmax performing unit 841.

The first probability distribution $P_1$ may correspond to depth ranges (for example, $d_1=4$) of the first depth resolution.

The generation apparatus 800 may predict the residual feature $R_1$ of the second depth resolution finer than the first depth resolution by the second decoder 823. The generation apparatus 800 may estimate a second probability distribution $P_2$ by aggregating the first probability distribution $P_1$ of a previous stage (the first depth resolution) and the residual feature $R_1$ of the second depth resolution by the PR 843. The second probability distribution $P_2$ may correspond to depth ranges (for example, $d_2=8$) of the second depth resolution.

Also, the generation apparatus 800 may predict the residual feature $R_2$ of the third depth resolution finer than the second depth resolution by the third decoder 825. The generation apparatus 800 may estimate a third probability distribution $P_3$ by aggregating the second probability distribution $P_2$ of a previous stage (the second depth resolution) and the residual feature $R_2$ of the third depth resolution by the PR 845. The third probability distribution $P_3$ may correspond to depth ranges (for example, $d_3=16$) of the third depth resolution.

For example, the generation apparatus 800 may predict the first probability distribution $P_1$ as an initial value, and may predict the second residual feature $\{R_k\}_{k=2}^3$ to add a finer structure to a coarse probability distribution (for example, the first probability distribution $P_1$) predicted at the first depth resolution.

Subsequently, the generation apparatus 800 may sequentially estimate the second probability distribution $P_2$ and the third probability distribution $P_3$. $\{P_k\}_{k=1}^2$ may be refined into $\{P_{k+1}\}_{k=2}^2$ by aggregating information from $\{R_k\}_{k=2}^3 \in R^{H_k \times W_k \times d_k}$ as shown in Equation 2 below.

$$P_{k+1} = f_{norm}(f_{up}(P_k)) + R_{k+1} \quad [\text{Equation 2}]$$

In Equation 2, $k \in \{2, 3\}$ may be satisfied.

The generation apparatus 800 may upscale a probability distribution $P_k$ through bilinear interpolation, and may sum the upscaled probability distribution $P_k$ and a residual feature $R_k$. In an upscaling process through $f_{up}$, two types of upsampling processes may be performed. The bilinear interpolation may be performed in a spatial domain so that an intermediate feature may have the same spatial size as $P_{k+1}$. Another interpolation may also be performed in a channel domain so that a channel size of a feature may have $d_{k+1}$.

The generation apparatus 800 may normalize an upscaled probability distribution through $f_{norm}$ so that a sum of all values in a channel direction is the same as "1", before summing the probability distribution $P_k$ and a residual feature $R_{k+1}$.

A target depth image $\overline{g}_3$ corresponding to an input image may be generated based on a finally estimated probability distribution among probability distributions for each depth resolution.

A probability distribution $\{P_k\}_{k=1}^3$ estimated at each depth resolution may be converted into a depth image $\{\overline{g}_k\}_{k=1}^3$, and may be compared with ground-truth depths at all depth resolutions.

The generation apparatus 800 may generate scale information of each stage, i.e., features for each of different depth resolutions in a multi-scale manner, to generate a finer depth image.

Also, the generation apparatus 800 may reconstruct probability distributions for each of different depth resolutions by features for each of different depth resolutions. For example, in the generation apparatus 800, a module to generate a depth resolution with a relatively low value may focus on a global structure, and other modules to generate a depth resolution with a relatively high value may generate fine depth information, and thus it is possible to generate a target depth image with a relatively high resolution.

Also, it is possible to more accurately refine features for each depth resolution using estimated probability distributions for each depth resolution, instead of refining a depth value.

Figure 9:
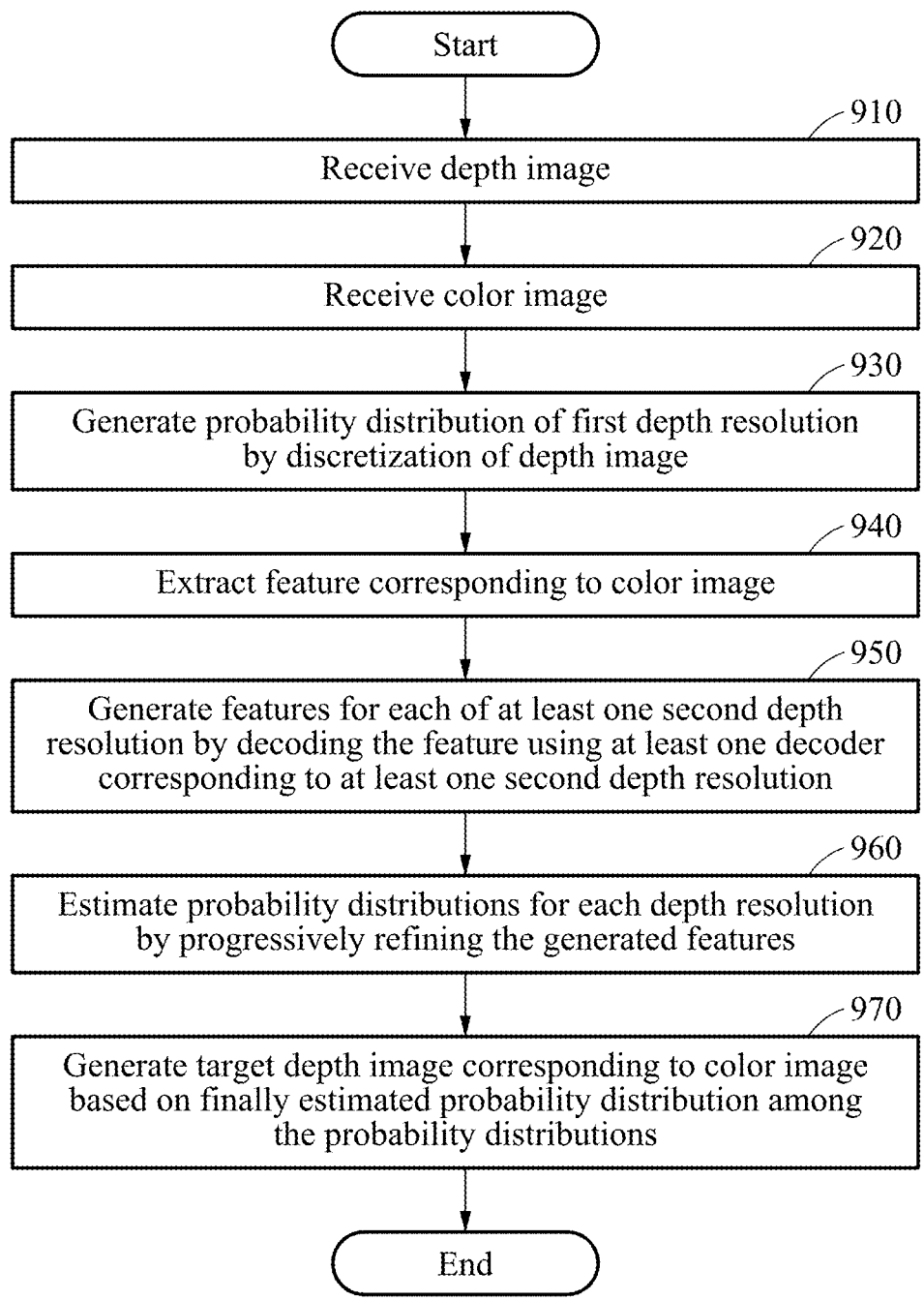
FIG. 9 is a diagram illustrating another example of a method of generating a depth image.
Figure 10:
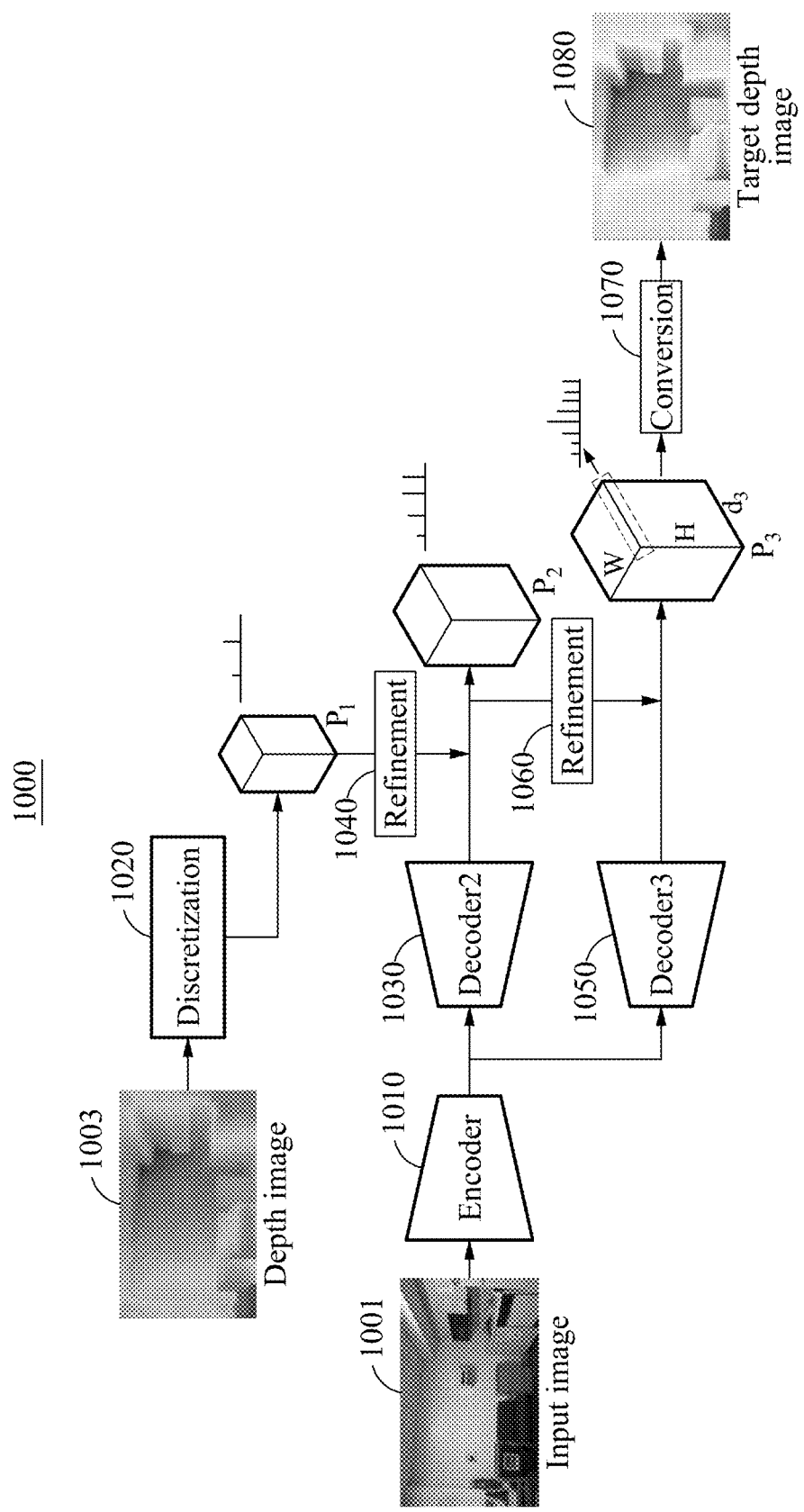
FIG. 10 illustrates another example of a configuration and an operation of an apparatus for generating a depth image.

FIG. 9 is a diagram illustrating another example of a method of generating a depth image. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions, and FIG. 10 illustrates an example of a configuration and an operation of such an apparatus 1000 for generating a depth image (hereinafter, referred to as a "generation apparatus 1000"). In addition to the description of FIG. 9 below, the descriptions of FIGS. 1-8 are also applicable to FIG. 9, and are incorporated herein by reference. Thus, the above description may not be repeated here.

FIGS. 9 and 10 illustrate a process by which the generation apparatus 1000 generates a high-quality target depth image by enhancing a low-quality depth image by performing operations 910 through 970.

In operation 910, the generation apparatus 1000 receives a depth image 1003. The depth image 1003 may correspond to a low-quality depth image corresponding to a color image that is an input image 1001 received in operation 920. The depth image 1003 may be sensed by a depth sensor, for example, a kinect, a time-of-flight (TOF) depth camera or an optical 3D scanner, configured to obtain a depth image representing depth information about an object. The depth image 1003 may be an image representing depth information that is associated with a depth (or a distance) from a capturing position to an object.

In operation 920, the generation apparatus receives the input image 1001, for example, a color image.

In operation 930, the generation apparatus generates a first probability distribution $P_1$ of a first depth resolution by discretization 1020 of the depth image 1003 received in operation 910.

In operation 940, the generation apparatus extracts a feature corresponding to the input image 1001 received in operation 920. For example, the generation apparatus may extract the feature corresponding to the input image 1001 by an encoder 1010.

In operation 950, the generation apparatus generates features for each of at least one second depth resolution by decoding the feature extracted in operation 940 using at least one decoder, for example, a second decoder 1030 and a third decoder 1050, corresponding to the at least one second depth resolution. In the present disclosure, the "at least one second depth resolution" may be understood to include all depth resolutions (for example, a third depth resolution and a fourth depth resolution) that have higher depth values than that of the second depth resolution in addition to the second depth resolution. For example, the generation apparatus may generate a residual feature of the second depth resolution using the second decoder 1030 corresponding to the second depth resolution. The generation apparatus may generate a residual feature of a third depth resolution that is finer than the second depth resolution, using the third decoder 1050 corresponding to the third depth resolution.

In operation 960, the generation apparatus estimates probability distributions for each depth resolution by progressively refining the features generated in operation 950. The generation apparatus may estimate a second probability distribution $P_2$ corresponding to depth ranges of the second depth resolution by refinement 1040 of the first probability distribution $P_1$ by the residual feature of the second depth resolution generated by the second decoder 1030. The generation apparatus may estimate a third probability distribution $P_3$ corresponding to depth ranges of the third depth resolution by refinement 1060 of the second probability distribution $P_2$ by the residual feature of the third depth resolution generated by the third decoder 1050.

In operation 970, the generation apparatus generates a target depth image 1080 corresponding to the input image 1001, based on a finally estimated probability distribution (for example, the third probability distribution $P_3$) among the probability distributions for each depth resolution. The generation apparatus may generate the target depth image 1080 by conversion 1070 of the third probability distribution $P_3$ that is a finally estimated discrete probability distribution into a continuous value. The target depth image 1080 may be used for object recognition, for example, 3D face recognition, or used for processing of a photographic effect, for example, out-of-focusing. The target depth image 1080 may be helpful in enhancing a performance of visual object recognition by determining a geometric relationship between objects or by providing 3D geometric information.

The generation apparatus may output the target depth image generated in operation 970.

Figure 11:
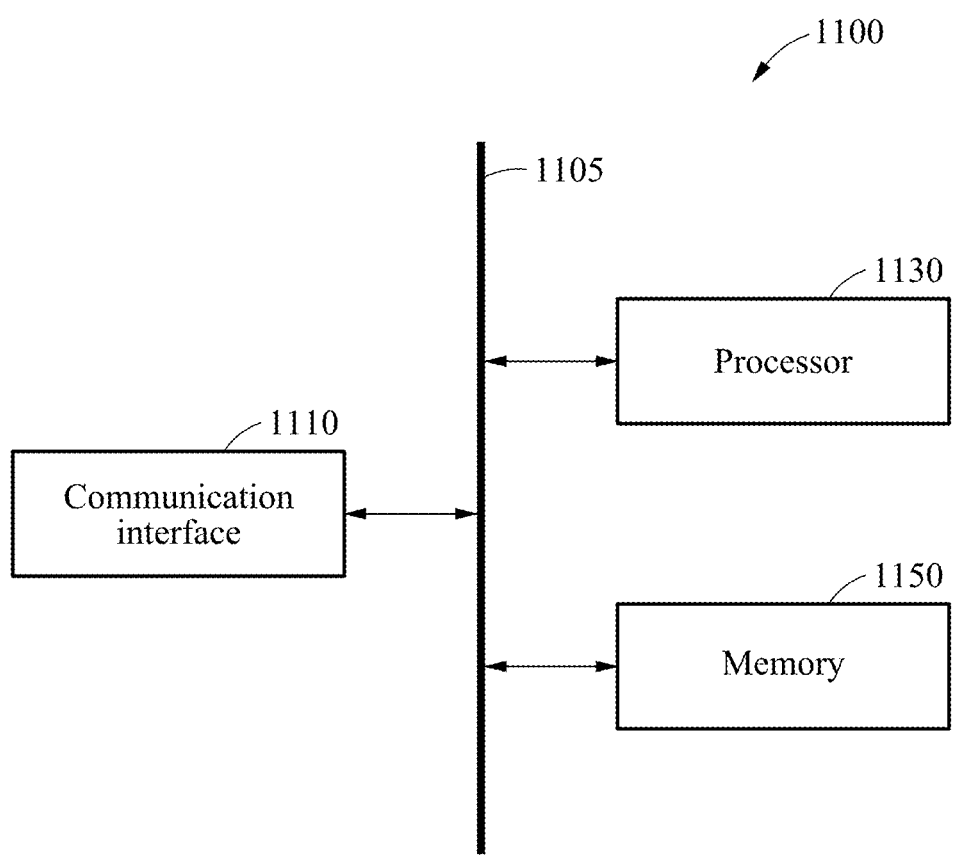
FIG. 11 is a diagram illustrating an example of an apparatus for generating a depth image.

FIG. 11 illustrates an example of an apparatus 1100 for generating a depth image (hereinafter, referred to as a "generation apparatus 1100"). Referring to FIG. 11, the generation apparatus 1100 includes a communication interface 1110, a processor 1130, and a memory 1150. The communication interface 1110, the processor 1130, and the memory 1150 may be connected to each other via a communication bus 1105.

The communication interface 1110 may receive an input image. Also, the communication interface 1110 may output a target depth image generated by the processor 1130.

The processor 1130 may extract a feature corresponding to the input image. The processor 1130 may generate features for each depth resolution by decoding the feature using decoders corresponding to different depth resolutions. The processor 1130 may estimate probability distributions for each depth resolution by progressively refining the features for each depth resolution. The processor 1130 may generate the target depth image corresponding to the input image based on a finally estimated probability distribution among the probability distributions for each depth resolution. Further details regarding the processor 1130 is provided below.

The memory 1150 may store the input image. Also, the memory 1150 may store the target depth image generated by the processor 1130.

Also, the memory 1150 may store a variety of information generated in a processing process of the processor 1130. In addition, the memory 1150 may store a variety of data and programs. The memory 1150 may include, for example, a volatile memory or a non-volatile memory. The memory 1150 may include a large-capacity storage medium such as a hard disk to store a variety of data. Further details regarding the memory 1150 is provided below.

Depending on examples, the generation apparatus 1100 may further include sensors, for example, an image sensor configured to sense or capture an input image, a camera, a depth sensor configured to sense a depth value, and/or a depth camera. The generation apparatus 1100 may further include a display device configured to display a target depth image corresponding to an input image. In an example, the display device is the communication interface 1110. The display device is not limited to the example described above, and any other displays, such as, for example, computer monitor, smartphone, a smart television (TV), a tablet, a head-up display (HUD), a three-dimensional (3D) digital information display (DID), a 3D mobile device, and a smart automobile, display of an advanced driver-assistance systems (ADAS), and eye glass display (EGD) that are operatively connected to the apparatus 1100 for generating a depth image may be used without departing from the spirit and scope of the illustrative examples described.

Also, the processor 1130 may perform any one or any combination of the methods described above with reference to FIGS. 1 through 10 or an algorithm corresponding to at least one of the methods. The processor 1130 may be a hardware-implemented data processing device having a circuit that is physically structured to execute desired operations. For example, the desired operations may include code or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The generation apparatus 200, generation apparatus 800, generation apparatus 1000, apparatus 1100 for generating a depth image, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a field-programmable gate array (FPGA), an application-specific integrated circuit (ASIC), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of generating a depth image. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that may be configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a depth image, the method comprising:
    receiving an input image;
    extracting a feature corresponding to the input image;
    generating features for each depth resolution by decoding the feature using decoders corresponding to different depth resolutions;
    estimating probability distributions to have greater numbers of class labels, each class label representing a discrete depth value corresponding to a respective range of depth values, for finer depth resolutions by progressively refining the features for each depth resolution; and
    generating a target depth image corresponding to the input image based on a final estimated probability distribution from among the probability distributions for each depth resolution.

2. The method of claim 1, wherein the generating of the features for each depth resolution comprises:
    generating a feature of a first depth resolution from among the depth resolutions using a first decoder corresponding to the first depth resolution; and generating a residual feature of a second depth resolution from among the depth resolutions using a second decoder corresponding to the second depth resolution.

3. The method of claim 1, wherein the generating of the features for each depth resolution further comprises generating a residual feature of a third depth resolution from among the depth resolutions using a third decoder corresponding to the third depth resolution.

4. The method of claim 1, wherein the generating of the features for each depth resolution comprises one of:
decoding the feature at uniformly set depth intervals, to generate the features for each depth resolution; or
decoding the feature at differently set depth intervals, based on a spacing-increasing discretization (SID) scheme, to generate the features for each depth resolution.

5. The method of claim 1, wherein the estimating of the probability distributions for each depth resolution comprises:
estimating a first probability distribution corresponding to depth ranges of a first depth resolution from among the depth resolutions, based on a feature of the first depth resolution; and
estimating a second probability distribution corresponding to depth ranges of a second depth resolution from among the depth resolutions, based on the first probability distribution and a residual feature of the second depth resolution.

6. The method of claim 5, wherein the estimating of the second probability distribution comprises refining the first probability distribution by the residual feature of the second depth resolution to estimate the second probability distribution corresponding to the depth ranges of the second depth resolution.

7. The method of claim 6, wherein the estimating of the second probability distribution comprises:
upscaling the first probability distribution; and
estimating the second probability distribution by refining the upscaled first probability distribution by the residual feature of the second depth resolution.

8. The method of claim 5, wherein the estimating of the probability distributions for each depth resolution further comprises estimating a third probability distribution corresponding to depth ranges of a third depth resolution from among the depth resolutions based on the second probability distribution and a residual feature of the third depth resolution.

9. The method of claim 8, wherein the estimating of the third probability distribution comprises refining the second probability distribution by the residual feature of the third depth resolution to estimate the third probability distribution corresponding to the depth ranges of the third depth resolution.

10. The method of claim 8, wherein the estimating of the third probability distribution comprises:
upscaling the second probability distribution; and
estimating the third probability distribution by refining the upscaled second probability distribution by the residual feature of the third depth resolution.

11. The method of claim 1, wherein the generating of the target depth image comprises converting the final estimated probability distribution into the target depth image.

12. The method of claim 1, wherein the generating of the target depth image comprises:
calculating an expectation value of the final estimated probability distribution;
estimating a refinement value of the expectation value based on the final estimated probability distribution; and
generating the target depth image based on the expectation value and the refinement value.

13. The method of claim 1, wherein
the different depth resolutions comprise at least two of a first depth resolution, a second depth resolution, and a third depth resolution,
the first depth resolution has a lower value than a value of the second depth resolution,
the second depth resolution has a higher value than a value of the first depth resolution, and
the third depth resolution has a higher value than a value of the second depth resolution.

14. The method of claim 1, further comprising:
discretizing a depth range of depth values of pixels included in the input image and dividing the depth range into a plurality of intervals.

15. The method of claim 1, further comprising:
outputting the target depth image.

16. The method of claim 1, wherein the input image comprises any one or any combination of a single color image, an infrared image, and a depth image.

17. A non-transitory computer-readable storage medium storing instructions that, when executed by a processor, cause the processor to perform the method of claim 1.

18. A method of generating a depth image, the method comprising:
receiving a depth image;
receiving a color image;
generating a probability distribution of a first depth resolution by discretizing the depth image;
extracting a feature corresponding to the color image;
generating features for each of at least one second depth resolution by decoding the feature using at least one decoder corresponding to the at least one second depth resolution;
estimating probability distributions to have greater numbers of class labels, each class label representing a discrete depth value corresponding to a respective range of depth values, for finer depth resolutions of the at least one second depth resolution by progressively refining the features for each of the at least one second depth resolution; and
generating a target depth image corresponding to the color image based on a final estimated probability distribution from among the probability distributions for each of the at least one second depth resolution.

19. An apparatus for generating a depth image, the apparatus comprising:
a communication interface configured to receive an input image; and
a processor configured
to extract a feature corresponding to the input image,
to generate features for each depth resolution by decoding the feature using decoders corresponding to different depth resolutions,
to estimate probability distributions to have greater numbers of class labels, each class label representing a discrete depth value corresponding to a respective range of depth values, for finer depth resolutions by progressively refining the features for each depth resolution, and to generate a target depth image corresponding to the input image based on a final estimated probability distribution from among the probability distributions for each depth resolution.

20. The apparatus of claim 19, wherein the processor is further configured to:
   generate a feature of a first depth resolution from among the depth resolutions using a first decoder corresponding to the first depth resolution; and
   generate a residual feature of a second depth resolution from among the depth resolutions using a second decoder corresponding to the second depth resolution.

21. The apparatus of claim 19, wherein the processor is further configured to generate a residual feature of a third depth resolution from among the depth resolutions using a third decoder corresponding to the third depth resolution.

22. The apparatus of claim 19, wherein the processor is further configured to:
   decode the feature at uniformly set depth intervals, to generate the features for each depth resolution; or
   decode the feature at differently set depth intervals, based on a spacing-increasing discretization (SID) scheme, to generate the features for each depth resolution.

23. The apparatus of claim 19, wherein the processor is further configured to:
   estimate a first probability distribution corresponding to depth ranges of a first depth resolution from among the depth resolutions, based on a feature of the first depth resolution; and
   estimate a second probability distribution corresponding to depth ranges of a second depth resolution from among the depth resolutions, based on the first probability distribution and a residual feature of the second depth resolution.

24. The apparatus of claim 23, wherein the processor is further configured to estimate the second probability distribution corresponding to the depth ranges of the second depth resolution by refining the first probability distribution by the residual feature of the second depth resolution.

25. The apparatus of claim 24, wherein the processor is further configured to:
   upscale the first probability distribution; and
   estimate the second probability distribution by refining the upscaled first probability distribution by the residual feature of the second depth resolution.

26. The apparatus of claim 23, wherein the processor is further configured to estimate a third probability distribution corresponding to depth ranges of a third depth resolution from among the depth resolutions based on the second probability distribution and a residual feature of the third depth resolution.

27. The apparatus of claim 26, wherein the processor is further configured to estimate the third probability distribution corresponding to the depth ranges of the third depth resolution by refining the second probability distribution by the residual feature of the third depth resolution.

28. The apparatus of claim 27, wherein the processor is further configured to:
   upscale the second probability distribution; and
   estimate the third probability distribution by refining the upscaled second probability distribution by the residual feature of the third depth resolution.

29. The apparatus of claim 19, wherein the processor is further configured to convert the finally estimated probability distribution into the target depth image.

30. The apparatus of claim 19, wherein the processor is further configured to:
   calculate an expectation value of the final estimated probability distribution;
   estimate a refinement value of the expectation value based on the final estimated probability distribution; and
   generate the target depth image based on the expectation value and the refinement value.

31. The apparatus of claim 19, wherein
   the different depth resolutions comprise at least two of a first depth resolution, a second depth resolution, and a third depth resolution,
   the first depth resolution has a lower value than a value of the second depth resolution,
   the second depth resolution has a higher value than a value of the first depth resolution, and
   the third depth resolution has a higher value than a value of the second depth resolution.

32. The apparatus of claim 19, wherein the processor is further configured to discretize a depth range of depth values of pixels included in the input image and to divide the depth range into a plurality of intervals.

33. The apparatus of claim 19, wherein the communication interface is further configured to output the target depth image.

34. The apparatus of claim 19, wherein the input image comprises any one or any combination of a single color image, an infrared image, and a depth image.

35. The apparatus of claim 19, wherein the apparatus comprises any one or any combination of a smartphone, a smart television (TV), a tablet, a head-up display (HUD), a three-dimensional (3D) digital information display (DID), a 3D mobile device, an eye glass display (EGD), and a smart automobile.

36. A method of generating a depth image, the method comprising:
   receiving an input image;
   extracting a feature corresponding to the input image;
   generating a feature of a first depth resolution by decoding the feature using a first decoder corresponding to the first depth resolution;
   determining a first probability distribution corresponding to depth ranges of the first depth resolution, based on the feature of the first depth resolution;
   generating a residual feature of a second depth resolution having a finer resolution than the first depth resolution, using a second decoder corresponding to the second depth resolution;
   determining a second probability distribution corresponding to depth ranges of the second depth resolution and having a greater number of class labels, each class label representing a discrete depth value corresponding to a respective range of depth values, than the first probability distribution, based on the first probability distribution and the residual feature of the second depth resolution;
   generating a target depth image corresponding to the input image based the second probability distributions; and
   outputting the target depth image.

37. The method of claim 36, wherein a value of the first depth resolution is lower than a value of the second depth resolution.

* * * * *